Jan. 5, 1971      E. G. VAIL ET AL      3,551,909
UNIVERSAL CABLE RESTRAINED WAIST JOINT FOR PRESSURIZED SUIT
Filed March 4, 1968
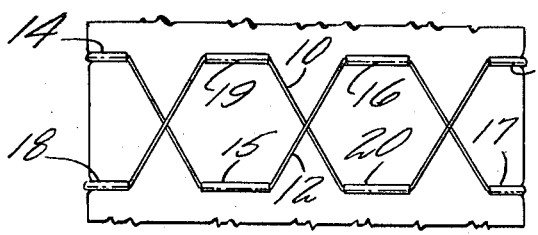
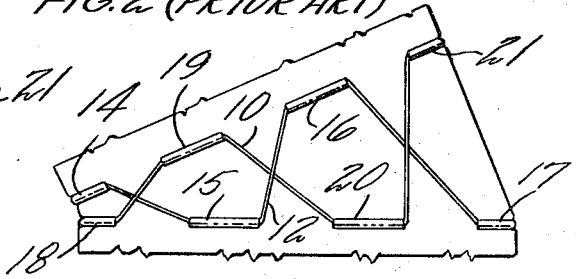
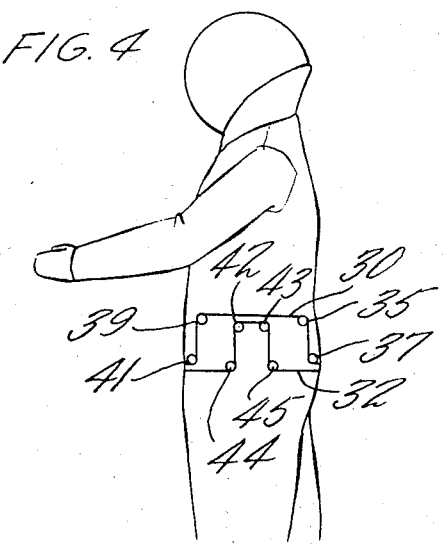
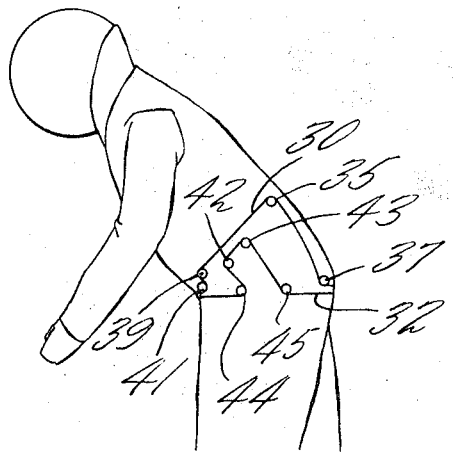
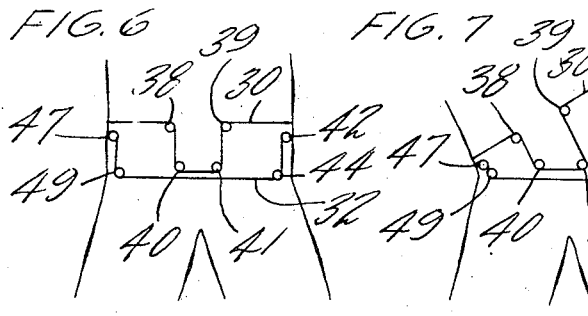
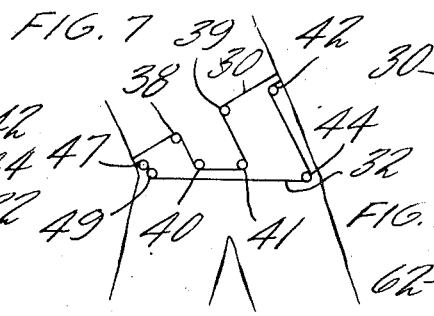
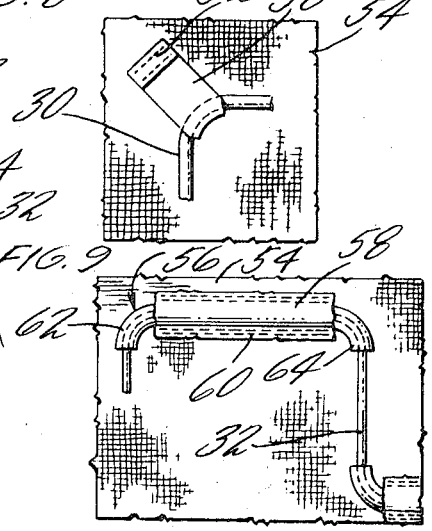
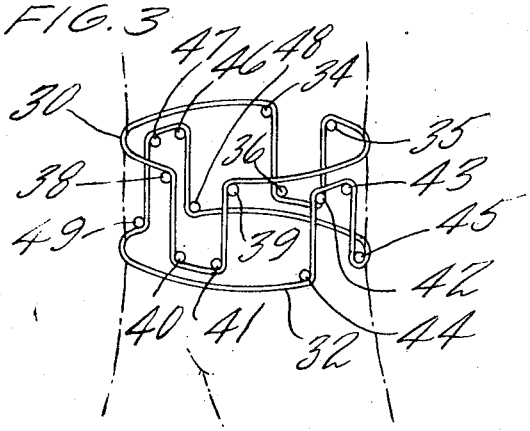
INVENTORS
EDWIN G. VAIL
DOUGLAS E. GETCHELL
BY Melvin Pearson Williams
ATTORNEY

United States Patent Office 3,551,909
Patented Jan. 5, 1971

3,551,909
UNIVERSAL CABLE RESTRAINED WAIST JOINT FOR PRESSURIZED SUIT
Edwin G. Vail, Simsbury, and Douglas E. Getchell, Windsor Locks, Conn., assignors to United Aircraft Corporation, East Hartford, Conn., a corporation of Delaware
Filed Mar. 4, 1968, Ser. No. 710,387
Int. Cl. B63c
U.S. Cl. 2—2.1                                1 Claim

ABSTRACT OF THE DISCLOSURE

A pair of complementary circumferential cables provide axial and hoop load restraint about the waist of a space suit. The first cable includes vertically extending portions at the front and back of the suit, and the second cable includes vertically extending portions at the side of the suit, which portions provide plug load strength across the height of the waist strain section. Any bending motion about the waist results in either or both of these cables adjusting the length of the vertically extending portion, one side becoming longer and the other side shorter for any one cable, as a result of any bending of the space suit, the overall length, and the tension in the cables remaining constant during the bending motion.

BACKGROUND OF THE INVENTION

Field of the invention

This invention relates to protective suits such as pressurized space suits, and more particularly to a universal cable restrained waist joint therefor.

Description of the prior art

As is known in the art, space suits are required to be internally pressurized in order to maintain a sufficient pressure within the suit so as to prevent undue physiological effects upon the wearer as a result of low ambient pressures of the environment. When a space suit is pressurized, the pressure tends to force the walls of the suit outwardly in all directions. This means that the suit attempts to balloon outwardly circumferentially, which is defined herein as hoop loads. It also means that the space suit attempts to stretch longitudinally, which is defined herein as plug load. In order for the space suit not to stretch and balloon outwardly, cables are used to resist plug loads and hoop loads. As used herein "cable" includes any form of generally flexible strand capable of withstanding tensile forces. For instance, it is known to provide cables along the length of the arms and the legs to prevent longitudinal stretching of these portions of the space suit, and various combinations of cables have been provided heretofore to restrain shoulder areas while permitting some semblance of normal shoulder motion by the wearer of the suit.

One particular aspect of space suits heretofore available has been the extreme difficulty in attempting to bend either in a backward and forward or a side-to-side manner at the waist. Space suits available heretofore have resulted in great fatigue of the wearer, and have been limited to maximum mobility to only a few degrees of bending in any direction.

SUMMARY OF INVENTION

It is the object of the present invention to provide a highly mobile cable restraining system of a joint for a protective suit.

In accordance with the present invention, two complementary cables provide both hoop load restraint and plug load restraint about a joint of a space suit, any bending of the space suit at the joint resulting in either or both of the cables automatically adjusting for variations in the length of hoop load and plug load restraining portions as required during the bending motion.

A pressurized suit incorporating the present invention permits completely flexible motion about the joint, subject only to the overall limitations of the fabric structure of the suit itself, with a minimum of effort required by the wearer of the suit and a minimum of suit fabric distortion as a result of bending motions.

Other objects, features and advantages of the present invention will become more apparent in the light of the following detailed description of a preferred embodiment thereof, as illustrated in the accompanying drawing.

BRIEF DESCRIPTION OF THE DRAWING

FIG. 1 is a simplified diagram of one form of plug and hoop load cable restraining systems for a joint used in pressurized suits known to the art;

FIG. 2 is an illustration of the exemplary prior art joint of FIG. 1 as ideally adjusted during the bending at the joint;

FIG. 3 is a simplified schematic perspective of a cable restraint system in accordance with the present invention;

FIG. 4 is a side view of the embodiment of FIG. 3 shown with the joint unflexed;

FIG. 5 is a simplified schematic side view of the embodiment of FIG. 4 shown with the joint flexed by bending forwardly;

FIG. 6 is a front view of the embodiment of FIG. 3 shown with the joint unflexed in an upright position;

FIG. 7 is a front view of the embodiment of FIG. 6 shown with the joint flexed as a result of bending to the right;

FIG. 8 is a pictorial illustration of one form of cable guide which may be utilized as a substitute for the idealized rollers illustrated in FIGS. 3–7; and FIG. 9 is a pictorial illustration of a cable guide of the turn-around type which may be utilized in place of the idealized rollers of FIGS. 3–7.

DESCRIPTION OF THE PREFERRED EMBODIMENT

Referring now to FIG. 1, a typical joint structure used in various portions of pressurized suits, such as space suits, known to the prior art includes a pair of complementary restraining cables, a cable 10 being confined by cable guides 14–17 and a cable 12 being confined by cable guides 18–21. The guides 14–17 alternate in upper and lower positions with respect to the guides 18–21 so as to form a crisscross pattern of the cables 10–12. As seen in FIG. 2, when the joint is flexed, such as results from bending at the waist in a waist joint, the cable guides 14–17 become very close together, and the cable guides 18–21 are spread far apart, with the intermediate guides being spread nearly proportional amounts. This sort of joint has been found satisfactory only for use in joints with a minimum of flexure required. The reason is believed to be due in part to the fact that as the length of cable is shortened between guides 14 and 15 and guides 18 and 19, it is lengthened by a disproportional amount between guides 16 and 17 and guides 20 and 21, respectively. Since the space suit is under pressure, there are hoop load and plug load forces acting on the joint. In order to adjust for the different individual lengths of cables 10, 12 between the guides 14–17, 18–21, the wearer of the suit must exert counterforces in making the bending motion that results in flexing of the joint. For instance, assuming that a waist joint is under consideration, the wearer cannot simply bend to one side or the other or bend forwardly, but rather must push himself against the forces exerted by the suit in order to reorient the joint that must flex for the bending motion desired. This has resulted in extreme fatigue on the part of suit occupants. Additionally, because of the wide divergence in angles of the cables 10, 12 when the joint is flexed, it becomes nearly impossible to provide adequate plug and hoop load restraint. For instance, the portion of the cable 12 between cable guides 14 and 15 is almost nearly horizontal, and only a small component of the restraining tensile forces within the cable 12 at this point is useful in supplying plug load restraint. Similarly, the portion of the cable 10 between guides 20 and 21 is so nearly completely vertical that virtually no hoop load restraining tension is provided by this portion of the cable 10. This causes a tendency for ballooning at the outward end of the joint and causes a tendency for the joint to expand with plug load at the left or compressed side of the joint (to the left in FIG. 2). Since the plug load does not adequately compensate and tends to open the joint up longitudinally at precisely the point where the joint is supposed to become compressed, it is obvious that the joint is unsatisfactory since the compensations provided thereby are directly opposite to the desired forces during the flexing of the joint.

Since the plug load inserted on the joint tends to maintain the joint in the unflexed position, once the wearer of the suit flexes the joint, he must continue to maintain forces in opposition to the forces exerted by the plug load. In order to assist the wearer to maintain a flexed position of the joint, cable systems of the prior art (such as that illlustrated in FIGS. 1 and 2) have frequently been provided with frictional cable guides such that once the joint is flexed, the friction in the guides tends to provide tensile forces within the cables 10, 12 so as to overcome in part the plug load forces. However, this necessarily means that the same frictional forces within the cable guides restrict the flexing of the joint in the first place and therefore cause a greater amount of exertion to be required by the wearer in order to flex the joint.

The joint illustrated in FIGS. 1 and 2 is merely illustrative of one form of joint known in the prior art. Other cable restraining and mechanical systems for providing joints are known, but it should be obvious to those skilled in the art that the foregoing serves as a suitable example to illustrate problems related to pressurized suits, and should not be intended to be the sole joint for which the present invention provides an improvement.

Referring to FIG. 3, a cable restraint joint in accordance with the present invention includes an upper cable 30 and a lower cable 32. The upper cable 30 is provided, for example, with two upper guides 34, 35 at the rear, two lower guides 36, 37 at the rear, the lower guide 37 being blocked from view by a left side upper guide 42 relating to the lower cable 32. The upper cable 30 is also guided by a pair of front upper guides 38, 39 and a pair of front lower guides 40, 41. The lower cable 32 is guided by a pair of left hand upper guides 42, 43 and a pair of left hand lower guides 44, 45 as well as a pair of right hand upper guides 46, 47 and a pair of right hand lower guides 48, 49. As illustrated in FIGS. 3-7, in order to facilitate simplicity in the understanding of the present invention, the cable guides 34-49 are illustrated as being rollers or round guides which may be pivoted or pinned to underlying material or plates. However, the guides may take either of the forms illustrated in FIGS. 8 or 9, as is described more fully hereinafter. In any event, it should be understood that the distance between pairs of guides may be accurately controlled to prevent tension and compression forces from altering the relative positions of these guides. For instance, the guides 34, 35 may be disposed on a single plate or on plates fixed to a suitable thickness of cloth so as to avoid the lateral displacement of the two guides relative to each other as a result of tensile forces in the cable 30. Similarly, the guides 40, 41 may be disposed on a single plate so as to resist both tensile and compressive forces, if desired. However, since the hoop load in the suit (the tendency to balloon circumferentially outward as a result of pressure in the suit) tends to drive the guides 40, 41 apart, and the tensile forces in the cable 30 tend to draw the guides 40, 41 together, these guides will, in a suitable embodiment, be positionally stable merely by being mounted individually to the fabric of the suit.

Thus, hoop load restraint is provided by those portions of the cables 30, 32 which are found between the following pairs of cable guides: 34, 38; 35, 39; 36, 37; 40, 41; 46, 47; 45, 48; 42, 43; and 44, 49. Similarly, plug load restraint as provided by those portions of the cable found between the following pairs of cable guides: 34, 36; 35, 37; 43, 45; 42, 44; 39, 41; 38, 40; 47, 49; and 46, 48. The various cable guides as viewed in FIG. 3 are contained in four transverse planes.

The cable guides in each set being disposed so as to guide the related cable 30 in the outer plane of said set around a portion of the periphery of said restraint assembly 35, 39 which is less than half the circumference thereof, and thence longitudinally 39, 41, in a direction substantially parallel with said major axis, to the inner plane of said set and about a portion of the periphery 41, 40 of said inner plane which is less than half the circumference thereof, thence longitudinally 40, 38 back to the outer plane of said set and about a portion of the periphery 38, 34 of said outer plane which is less than half the circumference thereof, thence longitudinally 34, 36, back to the inner plane and about a portion of the periphery 36, 37 of said inner plane which is less than half of the circumference thereof, thence longitudinally 37, 35, back to the point of beginning.

The important concept of the present invention is found in the fact that the hoop load restraint is continuously maintained whether the joint is in an unflexed position (as in FIGS. 4 and 6) or whether the joint is flexed (as in FIGS. 5 and 7). Thus, as seen in FIGS. 5 and 7, when the joint is flexed, the plug load is no longer vertical (as shown in the figures) but is at some angle to vertical; the vertical portions of the cables are seen to be at substantially the same angle, thus continuing to provide plug load restraint. Similarly, as the hoop load varies from the horizontal, the generally horizontal or circumferential portions of the cables 30, 32 will assume a proper angle so as to continue to provide hoop load restraint. Since this is so, the wearer of the suit does not have to apply his own physical force to overcome plug load or hoop load in order to bend a joint.

Another aspect of the present invention is that the lengths of the cables 30, 32 can remain constant without any significant adjustment in the positioning of the suit relative to the cable guides. Also, the forces on any one portion of the cable remain about constant and work at very nearly the same angles with respect to the tensions in the cables caused by plug load and hoop load at any position of the joint. This contrasts with the prior art wherein the amount of tension capable of being exerted in either the hoop or plug directions varies considerably with various portions of the cables 10, 12 (FIGS. 1 and 2) as the joint assumes various positions of flexure.

A joint constructed in accordance with the principles of the present invention, and embodied as the waist joint of a space suit, has been found to give virtually unlimited bending capability (on the order of magnitude of 90% of the bending ability of the wearer when wearing loose, unrestraining clothing) with virtually no exertion required on the part of the wearer.

Referring now to FIG. 8, one form of cable guide may comprise a tab or loop 50 made of a suitable webbing such, as fabric, which is sewn (as at 52) or otherwise disposed on the webbing or fabric 54 of the space suit. This form of guide however is useful only when adequate tension is known to exist in the cables 30, 32 during all forms of flexure.

A preferred form of cabled guide is illustrated in FIG. 9 wherein a rigid or semirigid cylindrical structure or tube 56 is disposed to the fabric or webbing 54 of the space suit by means of a fabric tab 58 sewn (as at 60) or otherwise disposed on the fabric 54. The tubing 56 has a bend 62, 64 at each end thereof, so as to guide the cables 30, 32 through substantially right angle turns without binding of the cable. Because of the stable nature of the joint in accordance with the present invention, there is no need to provide drag forces in the cable guides as is required in many joints known to the prior art. Thus, the tubes 56 can be essentially frictionless, in contrast with those known to the prior art. In fact, rollers and pulleys may be used to advantage in certain embodiments of the present invention.

The invention has been illustrated in a highly schematic form, but those skilled in the art will understand the nature of remaining portions of the space suit which have been eliminated herefrom for simplicity. For instance, a suit capable of adjusting for surface area variations with flexure should be supplied according to the teachings of the prior art. Similarly, the schematic, simplified representation of the flexing of a joint made in accordance with the present invention illustrates more the principle of the invention than the various ways in which the invention may be embodied in different suits, or in different joints of a suit. Further, it should be understood that the principles of the present invention may be utilized to advantage in other than waist joints, the waist joint being chosen since it is a relatively simple joint to understand with respect to the present invention, and because the invention can be used to such great advantage in a waist joint. Thus, the invention has been described with respect to a typical embodiment, in simplified form, but it should be understood by those skilled in the art that the foregoing and various other changes and omissions in the form and detail thereof may be made therein without departing from the spirit and scope of the invention.

Having thus described a typical embodiment of our invention that which we claim as new and desire to secure by Letters Patent of the United States is:

1. A cable restraint assembly for restraining a generally cylindrical section of a pressurized protective suit from uncontrolled expansion in response to plug load forces, while permitting coordinated flexure of said section in response to movement of the wearer, said restraint assembly, when unflexed, assuming a generally cylindrical configuration about a major axis, comprising:

a generally cylindrical section of flexible material, a pair of endless cables; and a plurality of cable guides secured to said cylindrical section disposed in four planes substantially transverse to said major axis when said restraint assembly is unflexed, said four planes comprising two outer planes and two inner planes therebetween, the two outer planes defining the extent of said restraint assembly, said guides arranged in two sets, each relating to a corresponding one of said cables, each set of sets including the guides in one of said outer planes and the guides in the inner plane adjacent to the other of said outer planes; the cable guides in each set being disposed so as to guide the related cable in the outer plane of said set around a portion of the periphery of said restraint assembly which is less than half the circumference thereof, and thence longitudinally, in a direction substantially parallel with said major axis, to the inner plane of said set and about a portion of the periphery of said inner plane which is less than half the circumference thereof, thence longitudinally, back to the outer plane of said set and about a portion of the periphery of said outer plane which is less than half the circumference thereof, thence longitudinally, back to the inner plane and about a portion of the periphery of said inner plane which is less than half of the circumferene thereof, thence longitudinally, back to the point of beginning; said two sets of guides being configured in a fashion similar with one another but oriented oppositely with respect to said major axis, the two inner plane portions of each set being substantially diametrically opposite each other and angularly displaced about said general axis in alternate quadrants with respect to the two inner plane portions of the other set; said guides disposed so that neither cable crosses itself nor the other cable.

References Cited
UNITED STATES PATENTS

| | | | |
|---|---|---|---|
| 2,894,535 | 7/1959 | Hansen | 138—121 |
| 2,969,247 | 1/1961 | Eggmann | 138—120 |
| 3,406,723 | 10/1968 | Cornell | 138—121 |

MERVIN STERN, Primary Examiner

G. H. KRIZMANICH, Assistant Examiner